(12) United States Patent
Pfaller

(10) Patent No.: US 8,770,523 B2
(45) Date of Patent: Jul. 8, 2014

(54) AERODYNAMIC PROFILE WITH A REVERSIBLY DEFORMABLE CONTOUR FOR AIRCRAFT, IN PARTICULAR FOR ROTARY WING AIRCRAFT

(75) Inventor: Rupert Pfaller, Riemerling (DE)

(73) Assignee: Aircus Helicopters Deutschland GmbH, Donauwoerth (DE)

( * ) Notice: Subject to any disclaimer, the term of this patent is extended or adjusted under 35 U.S.C. 154(b) by 278 days.

(21) Appl. No.: 12/472,770

(22) Filed: May 27, 2009

(65) Prior Publication Data

US 2010/0090067 A1  Apr. 15, 2010

(30) Foreign Application Priority Data

May 27, 2008 (DE) .................. 10 2008 025 414

(51) Int. Cl.
*B64C 3/44* (2006.01)
(52) U.S. Cl.
USPC .......................................................... 244/219
(58) Field of Classification Search
USPC ................ 244/219, 199.1, 200.1, 203, 204.1
See application file for complete search history.

(56) References Cited

U.S. PATENT DOCUMENTS

| | | | | |
|---|---|---|---|---|
| 4,113,210 A * | 9/1978 | Pierce | ............................ | 244/219 |
| 5,662,294 A * | 9/1997 | Maclean et al. | ............... | 244/219 |
| 6,152,405 A * | 11/2000 | Muller | ............................ | 244/219 |
| 6,276,641 B1 * | 8/2001 | Gruenewald et al. | ......... | 244/213 |
| 6,491,262 B1 * | 12/2002 | Kota | .............................. | 244/219 |
| 6,648,599 B2 | 11/2003 | Preissler | | |
| 7,669,799 B2 * | 3/2010 | Elzey et al. | ............... | 244/123.12 |
| 7,717,373 B2 | 5/2010 | Jaenker | | |
| 2006/0186269 A1 | 8/2006 | Kota et al. | | |
| 2008/0226448 A1 | 9/2008 | Altmikus et al. | | |

FOREIGN PATENT DOCUMENTS

| | | |
|---|---|---|
| DE | 19643222 | 4/1998 |
| DE | 19804308 | 4/1999 |
| DE | 10116479 | 10/2002 |
| DE | 10304530 | 8/2004 |
| DE | 10334267 | 2/2005 |
| DE | 102007013289 | 9/2008 |

\* cited by examiner

*Primary Examiner* — Tien Dinh
*Assistant Examiner* — Keith L Dixon
(74) *Attorney, Agent, or Firm* — Brooks Kushman P.C.

(57) ABSTRACT

An aerodynamic profile (10) for aircraft, in particular for rotary wing aircraft, which profile (10) includes a cover skin (14, 15) on the pressure side and on the suction side, with a profile contour that is controllably formable in the rear profile region (13) by actuators (30), wherein each cover skin (14, 15) is designed as a non-shear-resistant sandwich that includes a film or foil (21, 22) which is connected to a non-shear-resistant core (20), wherein the cover skins (14, 15) are held in their profile shape by flexible webs (17).

20 Claims, 3 Drawing Sheets

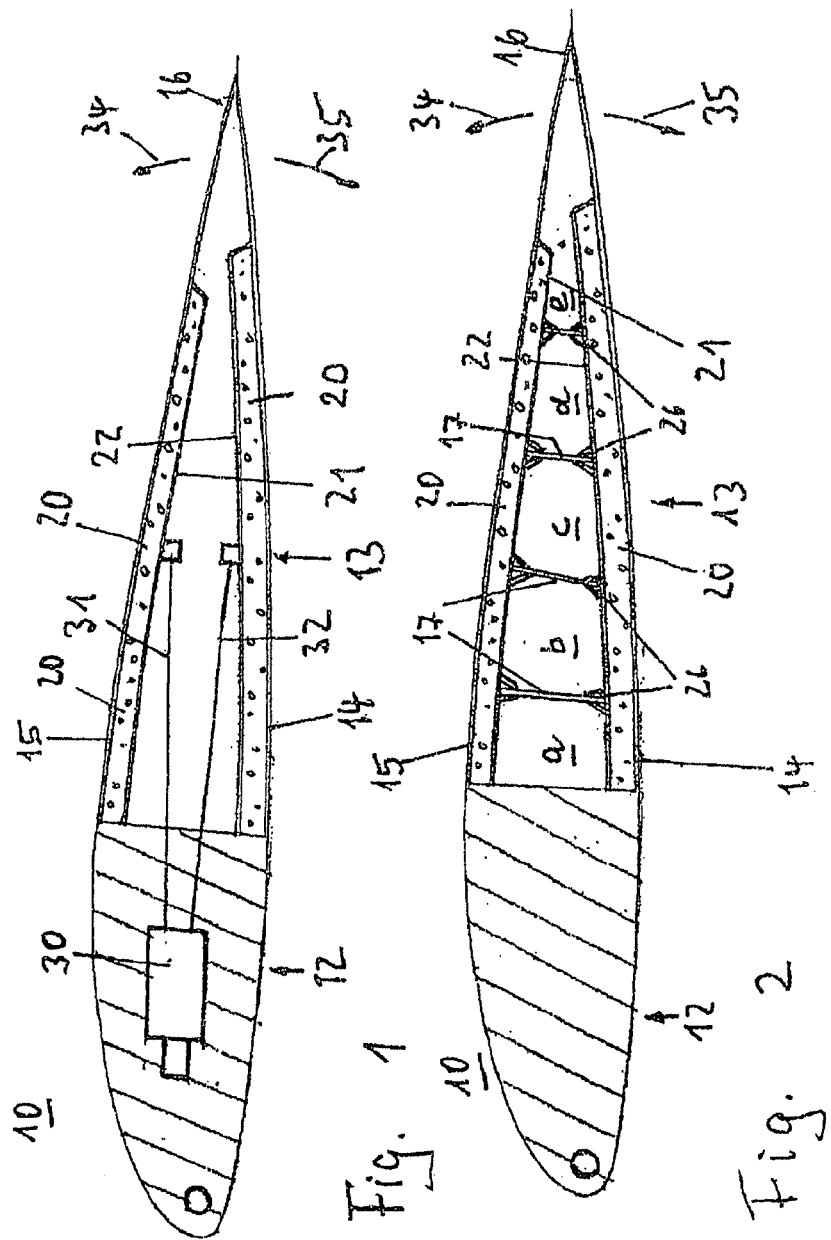

AERODYNAMIC PROFILE WITH A REVERSIBLY DEFORMABLE CONTOUR FOR AIRCRAFT, IN PARTICULAR FOR ROTARY WING AIRCRAFT

FIELD OF THE INVENTION

The invention relates to an aerodynamic profile with a reversibly deformable contour for aircraft, in particular for rotary wing aircraft.

It is well known that during flight, air vortices arise on aerodynamic profiles of aircraft. In particular on the rotor blades of rotary wing aircraft, these air vortices cause undesirable vibrations and noise, with the former being disadvantageous in view of the service life and maintenance of the rotors, because they result in material fatigue and wear of the components, and the latter being noticeable in an undesirable way in the cabin of a rotary wing aircraft, thus having a negative effect on the comfort of passengers.

In the case of rotor blades, these air vortices are caused by complex aeromechanical and aeroelastic phenomena, when a rotor blade encounters blade vortices of the rotor blade ahead of it the vortices are caused by resulting forces acting on the rotor blade. In order to be able to take account of these phenomena in various flight states and varying angles of incidence of the rotor blades as far as possible, rotor blades are used in which the contour of the rotor blade in the region of its trailing edge can be altered. By targeted adaptation of the rotor blade shape in the region of the trailing edge it is thus possible, as experience has shown, to reduce vibrations and noise, and at the same time to improve the flight performance and the flight range.

BACKGROUND OF THE INVENTION

In the state of the art, to this effect, discrete rotor blade flaps on the trailing edge of the rotor blade are known, which by means of a pivoting bearing are movably held to the rotor blade, compare DE 101 16 479 A1. The rotor blade flap is controllable by a piezo actuator, wherein the piezo actuator is arranged in a profile depth direction spaced apart from the flap in a front profile region of the rotor blade profile body. The actuating forces generated by the piezo actuator are transmitted to the rotor blade flap by way of strip-shaped or rod-shaped tension elements.

Due to the joints, this type of rotor blade is subjected to increased wear as well as being exposed to dust, dirt and water. Since the interior space of the rotor blade is difficult to seal in front of the flap, a short operating time to the exchange of the joints, or reduced effectiveness result due to frost and dirt particles that enter.

According to DE 103 34 267 A1, a rotor blade with an integral elastically movable rotor blade flap has become known, which can be actuated by means of piezoelectric actuators that are arranged in the rigid cover skins of the wing profile or immediately underneath the cover skins that are rigid per se or on the rigid cover skins. Actuating one of the two piezoelectric actuators on the top cover skin or on the bottom cover skin of the wing profile results in displacement of the respective cover skin relative to the other cover skin, as a result of which the top cover skin is shortened or lengthened relative to the bottom cover skin. Due to the relative shortening of a cover skin relative to the other cover skin, the rigid rotor blade flap that is affixed to the cover skins is displaced and moved upwards or downwards. A similar arrangement is also shown in DE 103 04 530 A1.

Since the piezoelectric actuators are either integrated in the profile without flap, or alternatively are provided exclusively in the flap, for system-related reasons the actuators need to be arranged near the trailing edge of the profile cross section. Since in this region of the rotor blade, due to slewing moments and centrifugal forces, considerable tensile strain occurs and since piezoelectric actuators as a rule are sensitive to strain, the centrifugal force that occurs can already during startup of a rotor lead to failure of the actuators. Furthermore, elastic bearings have a requirement spectrum of material, which spectrum is difficult to meet, namely high tensile-compressive strain, no energy absorption as a result of plastic behaviour, transmission of the aerodynamic forces without excessive deformation. Furthermore, the skin must be designed so as to be deflection resistant between the supporting locations (e.g. ribs, spars, webs etc.) in order to prevent undesirable profile deformation as a result of the aerodynamic loads that occur. Furthermore, the skin should be deflection resistant in order to prevent any interior supports from showing through on the exterior skin, thus negatively affecting the aerodynamic quality of the profile. On the other hand, the skin should be designed so as to be flexible in order to achieve corresponding deformation and in order to be able to deform the profile with little energy. These requirements are contradictory and so far it has not been possible to meet them.

OBJECT AND SUMMARY OF THE INVENTION

It is thus the object of the invention to avoid the disadvantages of the known aerodynamic profiles, in particular of the known rotor flaps of the type in question in the present document, and to significantly improve said aerodynamic profiles.

This object is met by the characteristics of claim 1. Advantageous improvements of the invention are stated in the subordinate claims.

As a result of the design and arrangement, according to the invention, of the aerodynamic profile with elastically reversibly deformable profile regions due to cover skins that enclose the profile, which profile regions in each case for a sandwich-like design comprise a relapsing soft elastic core, the profile can be given a reversible sinuous effect that is controllable in a targeted manner by way of actuators, by means of which sinuous effect the hitherto used adjustable discrete flaps that were arranged in the rear profile region are replaced. In this way both the discrete flap bearings which in practical application were exposed to increased wear due to high vibration frequencies and elements such as dust, dirt and water, and the disadvantages of hitherto used integral rotor blade flaps are avoided.

BRIEF DESCRIPTION OF THE DRAWINGS

Below, the invention is described with reference to several exemplary embodiments that in the drawing are shown in a more or less diagrammatical manner.

The following are shown:

FIG. 1 a view of a cross section of a generic aerodynamic profile in the form of a rotor blade for a helicopter;

FIG. 2 a second view of a cross section of an aerodynamic profile according to FIG. 1 according to a second exemplary embodiment of the invention;

MORE DETAILED DESCRIPTION

Figure 3:
FIG. 3 a third view of a section from an aerodynamic profile according to FIG. 1 with an elastically deformable cover skin according to a first embodiment.

An aerodynamic profile 10, which in FIGS. 1 and 2 is shown as a cross section of a rotor blade for a rotary wing aircraft, comprises a front solid profile region 12 and, following on from it, a rear profile region 13 that is situated in the direction of outflow and that comprises at least one hollow profile region. The profile region 13 is embodied by an elastic cover skin 14 on the pressure side, which cover skin 14 comprises a fibre structure, as well as by a likewise-designed elastic cover skin 15 on the suction side, which cover skins 14 and 15 merge in a trailing edge 16 of the profile rear edge 16, which extends in the direction of the wingspan, i.e. along the radius of the rotor blade.

In the profile region 13, for the purpose of controllably setting the aerodynamic lift $C_A$ and the profile moment $C_m$, the aerodynamic profile 10 comprises a reversible variable-shaped profile structure. This is achieved by a compliant design of the cover skins 14 and 15 that are associated with the hollow profile region.

To this effect each cover skin 14 and 15 on the inwards-facing surface is coated with a relapsing soft elastic core 20 which in each case is closed off by a film or foil 21 or 22. In the hollow profile regions a, b, c, d, e that are formed by the cover skins 14, 15 the contour of the profile 10 is affixed by flexible webs 17 arranged in between, as shown in FIG. 2. With a corresponding compliant design of the elastic cores 20 it is also possible to do without these webs, as shown in FIG. 1. For the purpose of improved elasticity in the region of the foot points, the faces of these webs, which faces form the foot points, are fanned open into individual "web feet". As a result of this fanning open, the web thickness is divided into two parts, or, depending on the number of "web feet", into several parts. If the web is, for example, divided into 2 web feet, the deflection resistance of a web is reduced to ⅛ and thus the deflection resistance of both webs is reduced to ¼ of the original value of the non-fanned-open web. This type of design is more advantageous, when compared to a division of the web over the entire length, because the short thin web feet do not bulge or buckle as readily as do longer regions. If the web were to be divided into several thin webs over the entire length, due to their larger length said webs would bulge or buckle more readily.

Figure 4:
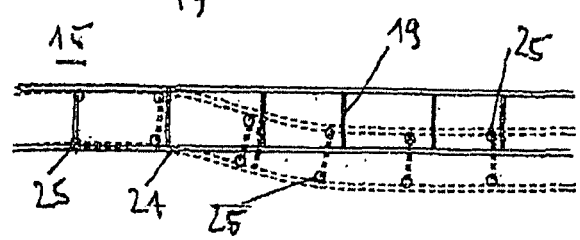
FIG. 4 a fourth view of a section of an aerodynamic profile according to FIG. 1 with an elastically deformable cover skin according to a second embodiment.
Figure 5:
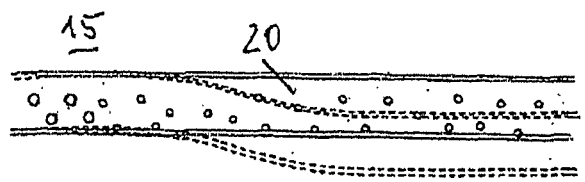
FIGS. 5 to 11 further views of variants of the cover skin according to the invention for an aerodynamic profile according to FIGS. 1 and 2.

As shown in FIGS. 3 to 5, the core can be designed in different ways. For example, FIG. 5 shows a design of the profile region with a relapsing soft elastic core 20. According to FIGS. 3 and 4, the relapsing soft elastic core can be replaced by correspondingly designed webs 19. According to FIG. 3, the flexible webs are directly attached to the cover skin or to the film or foil. According to FIG. 4, the relapsing soft elastic core is replaced by webs 19 that in the region for connection to the films or foils 21, 22 and to the cover skins 14, 15 are connected in a torsionally elastic manner with a correspondingly non-rigid adhesive. As shown in FIG. 4, this connection can also be designed as a link joint 25. With correspondingly compliant design of the relapsing soft elastic core 20 it is also possible, as shown in FIG. 5, to do without the webs 19 that have been arranged perpendicularly or obliquely to the direction of deformation.

FIGS. 6 to 11 show further embodiments of the cover skins 14 and 15, designed as a compliant sandwich structure, of the aerodynamic profile 10.

Figure 6:
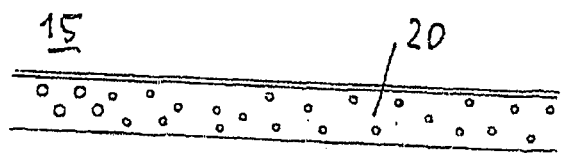
Figure 7:
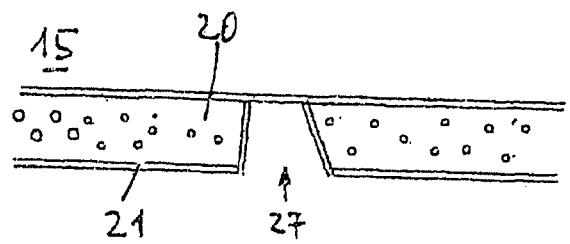
Figure 8:
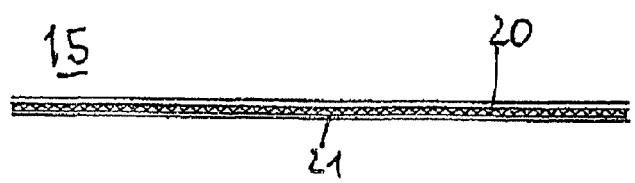
Figure 9:
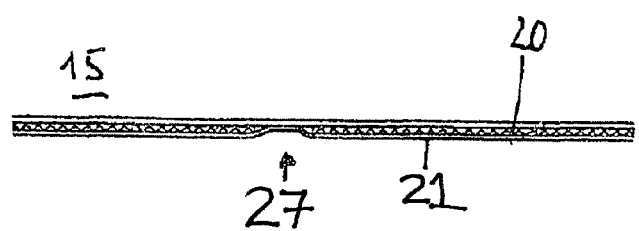
Figure 10:
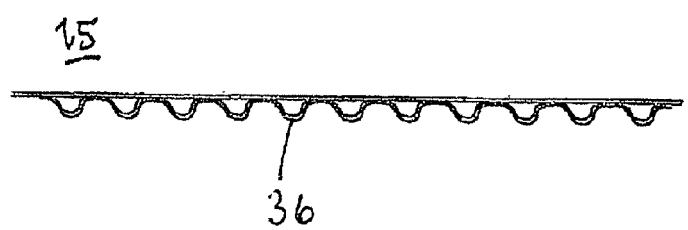
Figure 11:
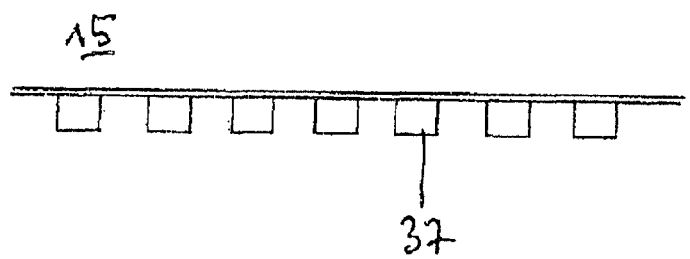

For example, FIG. 6 shows a relapsing soft elastic core 20 without a film or foil 21 or 22, while FIG. 7 shows a relapsing soft core 20 with interruptions 27, which core is firmly encompassed by the film or foil 21. This design is particularly advantageous for deformation of the cover skin in the region 16 comprising two reversal points, because in this way flexibility is incorporated in a targeted manner in the cover skin 14, 15. The core thicknesses of the core and of the film or foil 21, 22 that encompasses the core can vary, as shown in FIGS. 8 and 9. The bending lines of the cover skins can be influenced by the thickness and layer design of a fibre reinforced material and by the actuator arrangement. As shown in FIG. 6, the interior film or foil 21 of the cover skin can also be left out. As FIGS. 10 and 11 show, instead of an elastic core an undulating inner cover skin 36 in the form of a roll web, or, according to FIG. 11, strands 37 can be bonded onto the inside of the cover skins 14, 15.

For the purpose of controllably setting the aerodynamic lift $C_A$ and the profile moment $C_m$, i.e. in the form-variable profile structure 13, the aerodynamic profile 10 in its solid profile region 12 comprises suitable actuators 30, which by way of effective connections 31, 32 can influence one or the other of the cover skins 14, 15 such that they can be reversibly deformed in an s-shaped (space-moving) manner (compare FIG. 1). The actuators 30, which in the illustrations are shown diagrammatically only, can, for example, be so-called piezo-electric actuators. In this way the profile 10 in the region of its trailing edge 16 of the profile is controllably displaced, in the direction of the arrows 34, 35, in the manner of a Flettner flap. Since the profile region 13 of the profile 10 is elastically deformable as an entity, the actuators can also be arranged in the middle region of the profile depth of the hollow region 13.

LIST OF REFERENCE CHARACTERS

10 Aerodynamic profile
12 Front profile region
13 Rear profile region
14 Cover skin
15 Cover skin
16 Trailing edge of the profile
17 Flexible web
19 Webs
20 Non-shear-resistant elastic core
21 Film or foil
22 Film or foil
25 Elastic joints
26 Foot points
27 Interruptions
30 Actuators
31 Effective connection
32 Effective connection
34 Arrow
35 Arrow
36 Roll web
37 Strands
a, b, c, d, e Hollow profile region

The invention claimed is:

1. An aerodynamic profile for aircraft rotor blade, the aerodynamic profile comprising:
a rotor blade contour being reversible deformable wherein the contour is defined by a rear hollow profile region extending from a front solid profile region, the rear hollow profile region having bottom and top cover skins that extend from the front solid profile region and close off the rear hollow profile by providing a sealed coating on a pressure side and on a suction side of the rotor blade respectively, the bottom cover skin and the top cover skin merging in a trailing edge of the rear hollow profile region;

an elastic core disposed along an inwards-facing surface of each of the bottom and top cover skins;

at least one piezo-actuator connected to the rear hollow profile region by effective connections attached to the bottom cover skin and the top cover skin for controllably setting the position of the rear hollow profile region relative to the front solid profile region; and at least one layer design of fiber reinforced material to which at least one of the effective connections is attached, each layer design of fiber reinforced material having at least one targeted bending line of the cover skins formed adjacent the trailing edge, the targeted bending line defined by at least one of an interruption and an undulation or strand of the layer design of fiber reinforced material, wherein the rear hollow profile region is elastically deformable at the targeted bending lines which form reversal points upon actuation of the actuator as an integral Flettner flap being reversibly deformable to define the contour of the rear hollow profile region in an s-shaped manner.

2. The aerodynamic profile according to claim 1, wherein the elastic core of the hollow profile includes a plurality of flexible webs that are arranged between the cover skins.

3. The aerodynamic profile according to claim 2 wherein the elastic core is enclosed by at least one of a film or a foil opposite the cover skins.

4. The aerodynamic profile according to claim 3, wherein the flexible webs are connected to the film or foil of the cover skins by way of fanned-open faces that form foot points that serve as web feet.

5. The aerodynamic profile according to claim 3, wherein the flexible webs are connected to the film or foil and the cover skin by way of elastic joints.

6. The aerodynamic profile according to claim 1, wherein the elastic core is plate-shaped extending parallel along the cover skins.

7. The aerodynamic profile according to claim 1, wherein the elastic core includes interruptions.

8. The aerodynamic profile according to claim 1, the elastic core includes an elastic roll web including a plurality of webs that are flexibly arranged between the cover skins.

9. The aerodynamic profile according to claim 2, wherein the at least one piezoelectric actuator has a first portion arranged in the solid profile region of the aerodynamic profile and a second portion extending into the hollow profile region and connecting the piezoelectric actuator to the elastic core, wherein actuation of the piezoelectric actuator thereby deforms the rear profile region.

10. The aerodynamic profile according to claim 1, wherein both the pressure-side cover skin and on the suction-side cover skin are reversibly deformable in the s-shape manner.

11. A rotary wing aircraft rotor blade with a contour that is reversibly deformable, the rotor blade comprising:
a front solid profile region;
a rear hollow profile region connected to and rearward of the front solid profile region, the rear profile region comprising:
a first cover skin on a pressure side of the rear profile region;
a second cover skin on a suction side of the rear profile region, wherein the first cover skin and the second cover skin merge at a trailing edge of the rotor blade; the first cover skin and the second cover skin closing off the rear hollow profile region by a sealed coating of the pressure side and of the suction side of the rotor blade;
an elastic core layer disposed along an inwards-facing surface of each of the first cover skin and the second cover skin to form the rear hollow profile region therebetween;
at least one layer design of fiber reinforced material having at least one targeted bending line of the cover skins formed adjacent the trailing edge, the targeted bending line defined by at least one of an interruption and an undulation or strand of the layer design of fiber reinforced material; and
at least one piezoelectric actuator attached to the first and second cover skins at effective connections along the layer design of fiber reinforced material for controllably setting the position of the rear hollow profile region relative to the front solid profile region,
wherein, the rear hollow profile region is elastically deformable at the targeted bending lines which form reversal points upon actuation of the at least one piezoelectric actuator as an integral Flettner flap being reversibly deformable to define the contour of the rear hollow profile region in an s-shaped manner.

12. The rotor blade according to claim 11, wherein the rear profile region comprises two reversal points such that the rear profile region is deformable to define a generally s-shaped profile.

13. The rotor blade according to claim 11, wherein the elastic core comprises a first elastic layer on the first cover skin and covered by a first foil and a second elastic layer on the second cover skin and covered by a second foil.

14. The rotor blade according to claim 11, wherein the at least one piezoelectric actuator has a first portion disposed in the solid profile region and a second portion extending into the hollow profile region and connecting the piezoelectric actuator to the elastic core layers, wherein actuation of the piezoelectric actuator thereby deforms the rear profile region.

15. The rotor blade according to claim 12, wherein both the pressure-side cover skin and on the suction-side cover skin are elastically deformable.

16. The rotor blade according to claim 12, wherein rear profile region is reversibly deformable in a first direction and a second direction being opposite the first direction.

17. An rotary wing aircraft rotor blade with a contour that is reversibly deformable, the rotor blade comprising:
an aerodynamic profile defined by a first cover skin on a pressure side of the profile and a second cover skin on a suction side of the profile, the skins defining at least one hollow profile region therebetween, the first and second cover skins having an elastic layer extending along at least a portion of an inward-facing surface,
at least one layer design of fiber reinforced material having at least one targeted bending line of the cover skins formed adjacent a trailing edge of the profile, the targeted bending line defined by at least one of an interruption and an undulation or strand of the layer design of fiber reinforced material; and
at least one piezoelectric actuator attached to the first and second cover skins at effective connections along the layer design of fiber reinforced material for controllably setting the position of the hollow profile region, wherein the hollow profile region is elastically deformable at the targeted bending lines which form reversal points upon actuation of the at least one piezoelectric actuator as an integral Flettner flap being reversibly deformable, thereby elastically deforming the aerodynamic profile to define a generally s-shaped profile along to the hollow profile region.

18. The rotor blade according to claim 17, wherein the hollow profile region comprises at least two reversal points to promote formation of the generally s-shaped profile along the hollow profile region, wherein the reversal points are defined as interruptions in the elastic layers.

19. The rotor blade according to claim 18, further comprising least one interruption formed in the elastic layer extending along both the first and second cover skins to define the two reversal points such both the first cover skin and on the second cover skin are elastically deformable to define the generally s-shaped profile of the hollow profile region.

20. The rotor blade according to claim 18, wherein the hollow profile region defines a rear hollow profile region extending from a forward solid profile region of the rotor blade, the rotor blade further comprising:
  at least one piezoelectric actuator having a first portion disposed in the forward solid profile region and a second portion extending into the rear hollow profile region and connected with the cover skins,
  wherein, the rear hollow profile region is elastically deformable upon actuation of the at least one piezoelectric actuator.

* * * * *